United States Patent
Giedeman, III et al.

(10) Patent No.: US 6,681,969 B1
(45) Date of Patent: Jan. 27, 2004

(54) CONTAINER ASSEMBLY

(75) Inventors: Louis Albert Giedeman, III, Dearborn, MI (US); David James Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 09/625,256

(22) Filed: Jul. 25, 2000

(51) Int. Cl.[7] .................................................. B60R 7/00
(52) U.S. Cl. ...................... 224/275; 224/926; 297/188.2
(58) Field of Search ................................ 224/275, 539, 224/926; 297/188.2, 188.21, 253

(56) References Cited

U.S. PATENT DOCUMENTS

| | | | |
|---|---|---|---|
| 2,524,909 A | * 10/1950 | Hines .......................... | 224/275 |
| 2,640,595 A | * 6/1953 | Byford ......................... | 108/44 |
| 4,300,709 A | * 11/1981 | Page, Jr. ..................... | 224/275 |
| 4,756,573 A | 7/1988 | Simin et al. | |
| 4,832,241 A | 5/1989 | Radcliffe | |
| 4,938,401 A | 7/1990 | Weisbrodt et al. | |
| 5,282,598 A | * 2/1994 | Greene ....................... | 224/275 |
| 5,466,044 A | * 11/1995 | Barley et al. ............. | 297/250.1 |
| 5,487,588 A | 1/1996 | Burleigh et al. | |
| 5,551,750 A | 9/1996 | Yoshimura | |
| 5,601,334 A | 2/1997 | Marks | |
| 5,639,144 A | 6/1997 | Naujokas | |
| 5,690,356 A | * 11/1997 | Lane, Jr. ..................... | 280/735 |
| 5,816,651 A | 10/1998 | Feuerherdt | |
| 6,030,046 A | * 2/2000 | Dorow .................. | 297/216.11 |
| 6,082,818 A | * 7/2000 | Muller ..................... | 297/250.1 |
| 6,082,819 A | * 7/2000 | Jackson .................. | 297/250.1 |
| 6,279,798 B1 | * 8/2001 | Partch et al. ................ | 224/275 |

FOREIGN PATENT DOCUMENTS

| FR | 1.578.491 | 7/1969 |
|---|---|---|
| JP | 360001035 | 1/1985 |

OTHER PUBLICATIONS

ISO/TC 22/SC 12 N 448, Dated Oct. 16, 1997, Road Vehicles–Child restraint systems–Anchorages in vehicles and attachments to anchorages–Part 1: Demensions, strength requirements, and general requirements, SIS/SMS, Sweden.

* cited by examiner

Primary Examiner—Stephen K. Cronin
(74) Attorney, Agent, or Firm—David B. Kelley (57) ABSTRACT

A removable vehicular container assembly is provided that may be selectively secured upon a seat by the use of existing and standardized securing members. Container assembly may be utilized to securely maintain within the vehicle: various food and beverage containers, audio cassettes and compact discs, personal computing devices, and video gaming systems.

5 Claims, 5 Drawing Sheets

CONTAINER ASSEMBLY

FIELD OF THE INVENTION

The present invention generally relates to a container assembly and more particularly, to a removable vehicular container assembly that may be selectively secured upon a seat by the use of existing and standardized securing members.

BACKGROUND OF THE INVENTION

It is typically desirable to provide relatively wide and uninterrupted seating space within the passenger compartment of a vehicle. It is also concomitantly desirable to provide containers or storage members, within the vehicle, to securely hold various food and drink type items and/or other members or assemblies for use by the various vehicle passengers. In order to allow such desirable wide seating while concomitantly allowing some food or drink type items to be secured within a vehicle, small containers are typically provided within the instrument panel or vehicle console for use by the driver or passengers seated in the front of the vehicle.

While these containers do allow food or drink items to be secured within the vehicle, they suffer from some drawbacks. For example and without limitation, these containers are relatively small, thereby allowing only a relatively small amount of food or drink items to be secured within a vehicle. Moreover, since these containers are normally only deployed within the front of the vehicle, passengers disposed upon the "backseat" cannot typically utilize the containers and must hold these various items until they are consumed. Further, since these containers are only and conventionally adapted to secure food or drink items, a user must hold other items, such as a computer, as they are used. Lastly, many of these containers are not aesthetically pleasing and require mounting space which may be used by other desirable assemblies or apparatuses, thereby preventing the use of such other assemblies or apparatuses or necessitating an undesirable and operationally inefficient overall mounting arrangement.

It may therefore be desirable to provide a container assembly which may be removably and selectively secured within a vehicle and which overcomes at least some of the previously delineated drawbacks of prior container assemblies.

SUMMARY OF THE INVENTION

It is a first object of the present invention to provide a container assembly that overcomes at least some of the previously delineated drawbacks of prior assemblies.

It is a second object of the present invention to provide a container assembly which overcomes at least some of the previously delineated drawbacks of prior assemblies and which, by way of example and without limitation, may be selectively and removably disposed upon a seat.

It is a third object of the present invention to provide a container assembly which overcomes at least some of the previously delineated drawbacks of prior assemblies and which, by way of example and without limitation, may be selectively and operatively used in a desired portion of a vehicle.

It is a fourth object of the present invention to provide a container assembly which overcomes at least some of the previously delineated drawbacks of prior assemblies and which, by way of example and without limitation, may be selectively disposed upon a seat and selectively opened and extendable to an operative and supportive position.

It is a fifth object of the present invention to provide a container assembly which overcomes at least some of the previously delineated drawbacks of prior assemblies and which, by way of example and without limitation, may be selectively and operatively disposed upon a seat and selectively disassembled for storage.

It is a sixth object of the present invention to provide a container assembly which overcomes at least some of the previously delineated drawbacks of prior assemblies and which, by way of example and without limitation, includes an attachment portion which is movable from a first extended position to a second stored position within the assembly.

According to a first aspect of the present invention, a container assembly is provided. The container assembly is used with a seat of a vehicle of the type having at least one "ISOFIX" type attachment member. The container assembly comprises a containment portion; and at least one clamping member, which is attached to the containment portion and which has a slotted engagement channel formed to the same shape as the "ISOFIX" attachment member.

According to a second aspect of the present invention, a container assembly is provided. The container assembly includes a first recessed portion; a second portion which is pivotally coupled to the recessed portion which is movable from a first position in which the second portion overlays the first recessed portion to a second position; and a third portion which is disposed within the first portion and which is selectively movable from a first substantially flat position to an elevated and extended position.

According to a third aspect of the present invention, a container assembly is provided. The container assembly includes a first portion, which is movable from an operative open position to a closed position; and a second portion, which is disposed within the first portion and contains various typical electronic devices.

These and other features, aspects, and advantages of the present invention will become apparent from a reading of the following detailed description of the preferred embodiment of the present invention and by reference to the following drawings.

DETAILED DESCRIPTION OF THE PREFERRED EMBODIMENT OF THE INVENTION

Figure 1:
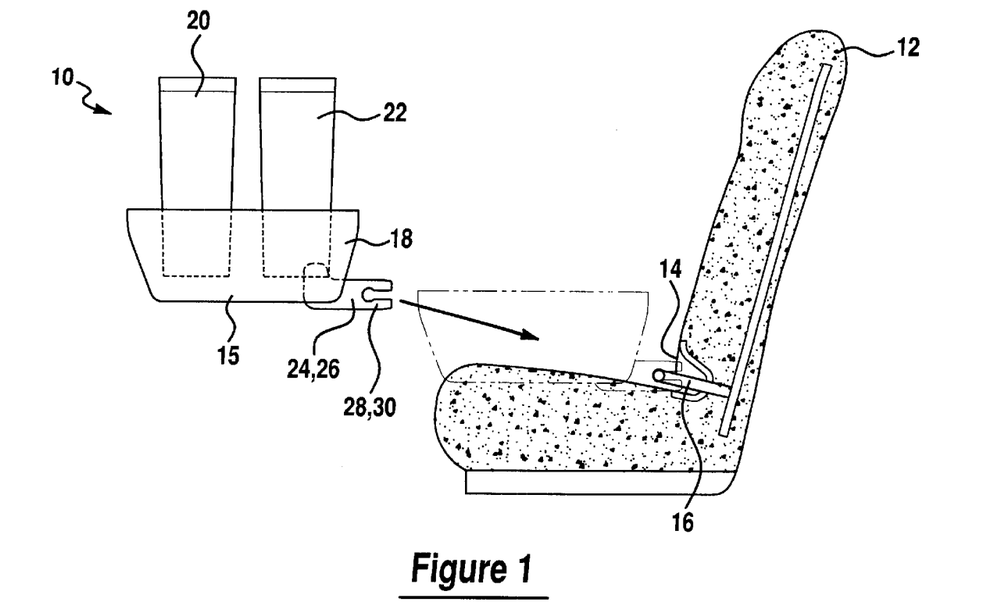
FIG. 1 is a side view of a container assembly that is made in accordance with the teachings of the preferred embodiment of the present invention.

Referring now to FIG. 1, there is shown a container assembly 10 which is made in accordance with the teachings of the preferred embodiment of the present invention and which is adapted to be selectively and removably secured to a conventional or typical vehicle seat 12.

As shown, seat 12 includes at least a pair of typical and standardized "ISOFIX" rigid anchor members 14, 16. Such members are described in various documents and/or standards promulgated by the International Standards Organization and further described within 49 CFR Parts 571 and 596 which are fully and completely incorporated herein by reference, word for word and paragraph for paragraph. Container assembly 10 has a containment portion 15 which has a generally flat and smooth bottom and integrally terminates upon and/or forms side portions 18 which cooperate with the bottom to receive and secure a pair of cups 20, 22 or other items. Container assembly 10 further includes a pair of substantially identical and outwardly protruding "C" shaped, clamping members 24, 26 which are adapted to selectively and removably receive a unique one of the ISOFIX members 14, 16, thereby cooperatively and removably securing container assembly 10 upon the seat 12.

The end of clamping member 26 that forms the "C" shaped slotted portion 28 is flexible and selectively expandable, thereby allowing ISOFIX member 16 to be received within slotted portion 28. The opening of slotted portion 28 is slightly smaller than the engagement portion of ISOFIX member 16. Therefore container assembly 10 must be installed onto the ISOFIX members 14 and 16 by moderate physical force. This physical action provided by a user to install the container assembly 10 causes the ends of the clamping members 24, 26 to open slightly to receive ISOFIX members 14 and 16.

That is, slotted portion 28 of the clamping member 26 is forced apart or slightly separated by the insertion of ISOFIX member 16. After ISOFIX member 16 is fully inserted within the slotted portion 28, the ends of the clamping member 26 retract or close slightly, thereby retaining ISOFIX member 16 within the slotted portion 28 of clamping member 26.

Clamping member 24, with its corresponding slotted portion 30, is substantially identical to clamping member 26 and is similarly and removably secured to ISOFIX member 14. Through a moderate physical force applied to container assembly 10 by a user, container assembly 10 may be selectively detached from ISOFIX members 14, 16. A user directed forward pulling action on container assembly 10 will selectively disengage clamping members 24, 26 from ISOFIX members 14, 16. In this manner, container assembly 10 may be selectively used in the front and back portions of a vehicle, wherever the ISOFIX retaining system is installed.

Figure 2:
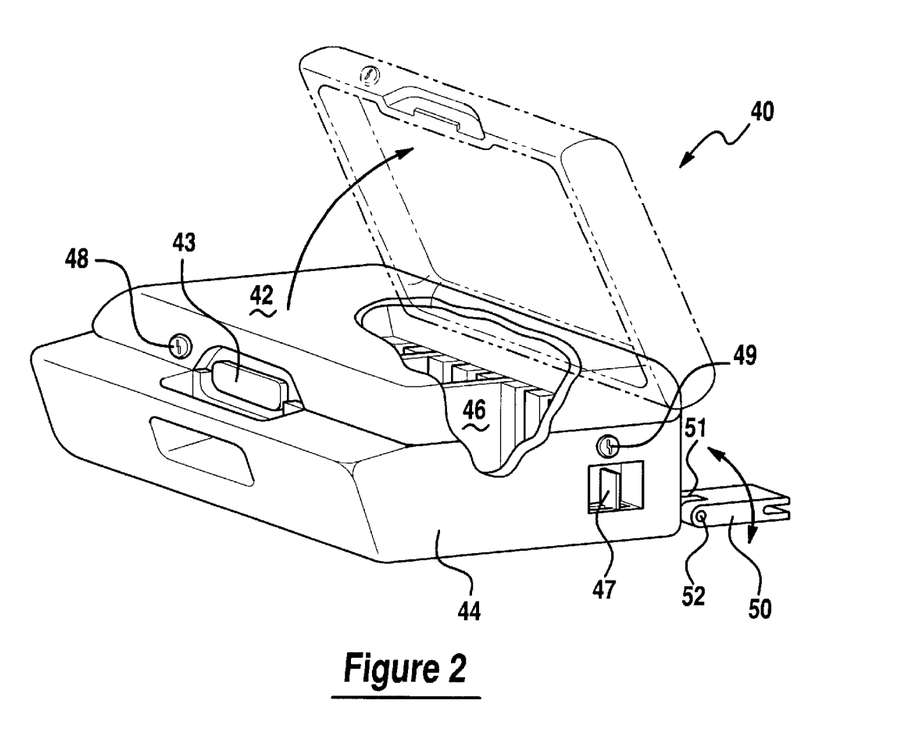
FIG. 2 is a perspective view of a container assembly that is made in accordance with the teachings of a second embodiment of the present invention.

Referring now to FIG. 2, there is shown a container assembly 40 that is made in accordance with the teachings of a second embodiment of the invention. As shown, container assembly 40 comprises a generally rectangular box with a top 42 which is pivotally coupled to a bottom portion or member 44 and which is movable between a first closed position and a second open position (shown in phantom) in which access is allowed to the interior compartment 46. In a non-limiting embodiment, interior compartment 46 has divider slots formed into the interior wall sections enabling the storage of audiocassettes and/or compact discs.

Top portion 42, when in a "first" or closed position, is secured to bottom portion 44 by a conventional latching mechanism 43. Further, in other non-limiting embodiments of the invention, assembly 40 may include a lock 48 that selectively prevents the latching mechanism 43 from operating and which, in turn, denies the ability to move top member 42 to the open position. Lock 48 may also operate independently of the latching mechanism 43 and when selectively placed in the locked position, lock 48 would merely provide a physical connection between the top 42 and bottom 44 portions, thereby preventing top portion 42 from pivoting open.

Container assembly 40 further includes a pair of substantially identical and outwardly protruding "C" shaped clamping members 50 which are adapted to selectively and removably receive a unique one of the ISOFIX members 14, 16 of seat 12, thereby cooperatively and removably securing container assembly 40 upon the seat 12. Clamping members 50 are also pivotally coupled to a pair of tabs 51, which are integrally formed with bottom portion 44 by pins or dowel members 52. In this manner, clamping members 50 can pivot in the horizontal plane to accommodate varied placements of the ISOFIX members and variations in the inclination of the seat bottom. Clamping members 50 are released from the ISOFIX members 14 and 16 by the selective movement of the physically attached and communicatively connected release lever 47. The release lever 47 functions to engage a conventional internal clamping mechanism (not shown) housed within the clamping member 50. The release lever 47 "spreads" or opens the internal clamping mechanism of the clamping members 50. The selective movement of the release lever 47 away from the clamping member 50 allows disengagement from the ISOFIX members 14 and 16 and thereby allows assembly 40 to be removed from the vehicle seat. To prevent unexpected or unwanted disengagement of the container assembly 40 from the seat, the release lever 47 is held in position by the release lever lock 49. The preferred embodiment of the release lever lock 49 is a depressible button, which releases the release lever 47. Another non-limiting embodiment may include the use of a key locking mechanism within the button to prevent unauthorized removal from the seat.

Figures 3, 3A:
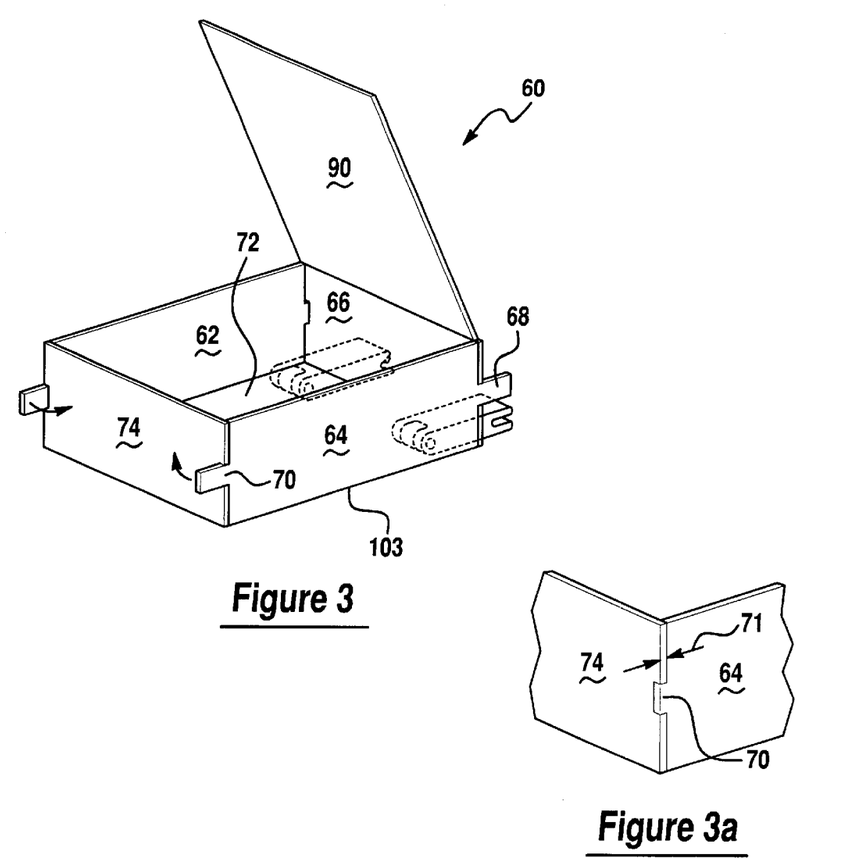
FIG. 3 is a perspective assembled view of a container assembly that is made in accordance with the teachings of a third embodiment of the present invention.
FIG. 3a is a perspective assembled view of a corner of a container assembly that is made in accordance with the teachings of a third embodiment of the present invention.
Figure 4:
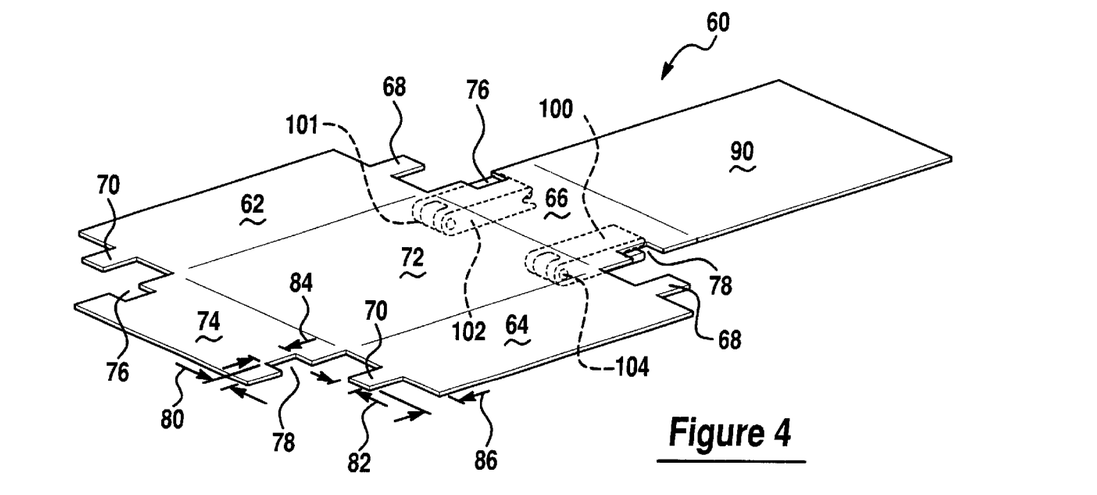
FIG. 4 is a perspective unassembled view of the container assembly that is shown in FIG. 3.

Referring now to FIGS. 3, 3a, and 4, there is shown a container assembly 60 that is made in accordance with the teachings of a third embodiment of the invention. As shown, container assembly 60 includes first and second substantially identical side portions 62, 64, each of which has a substantially identical and generally rectangular body portion and a pair of substantially identical tab extension portions 68, 70. Container 60 further has a substantially rectangular middle body or "bottom" portion 72 which is pivotally coupled to the portions 62, 64 and which, in one non-limiting embodiment of the invention, is linearly co-extensive to portions 62, 64. Container 60 further includes a front portion 74 and a rear portion 66, both of which are pivotally coupled to portion 72. Rear portion 66 is also pivotally connected to top portion 90.

Front and rear portions 66, 74 each further include a pair of substantially identical notches 76, 78. Particularly, each of the notches 76, 78 has a length 84 which is slightly smaller than the length 82 of each of the tab extension portions 70 on side members 62, 64. This allows for a relatively tight friction fit of the tab extension portions 68, 70 into the notches 76, 78 of the front and rear members when assembled.

The notch depth 80 of the member notches 76, 78 is large enough to accommodate the material thickness 71 of members 62, 64, such that when front and side members are engaged, front member 74 overlaps the end of side members 62, 64 and tab extensions 70 extend forward from front member notches 76, 78, as best shown in FIG. 3. This likewise occurs with tab extensions 68 when engaged with the notches of the rear member 66. Since the tabs 68, 70 are constructed in such a manner as to extend outward in length respectively beyond front and rear members 66, 74, extension tabs 68, 70 can be bent over front member 74 and rear member 66 to aid in forming and securing the rectangular box shape of container assembly 60.

FIG. 3a shows a non-limiting embodiment in which the tab extension lengths 86 of all four tab extensions 68 and 70 are only long enough to accommodate the material thickness 71 of member 74 (i.e., tabs 68, 70 do not extend outward beyond the corners of assembly 60). Thus, when assembled, the vertical edges of the corners of container assembly 60 are "flush", as shown in FIG. 3a.

Container 60 may be selectively assembled, as best shown in FIG. 3, by placing members 62, 64, 66, and 74 in an upright or raised position and by placing each of the tab extension members 68, 70 within a unique one of the slots 76, 78. As shown in FIG. 4, container 60 may be selectively disassembled and made to be substantially flat in order to allow the container 60 to be easily stored when not in use.

When container assembly 60 is assembled, a pair of substantially identical clamping members 100, 102 (which are substantially identical to clamping members 50) may be selectively secured to the unique ISOFIX type attachment members (FIG. 1, numbers 14, 16). Bottom surface 103 includes integral tabs 101 that allow members 100, 102 to be pivotally secured to portion 72 by pins 104. This pivotal attachment allows for seat angle variations when clamping members 100, 102 are connected to the ISOFIX members. Additionally, clamping members 100, 102 may be folded back against bottom surface 103 when container assembly 60 is disassembled and stored.

When container assembly 60 is assembled and securely connected to seat through ISOFIX members, various items may be securely placed inside container assembly 60 upon portion 72. Cover 90 may selectively overlay the upper edges of front and side members 62, 64, 74 to enclose the rectangular box structure of the assembly.

Figure 5:
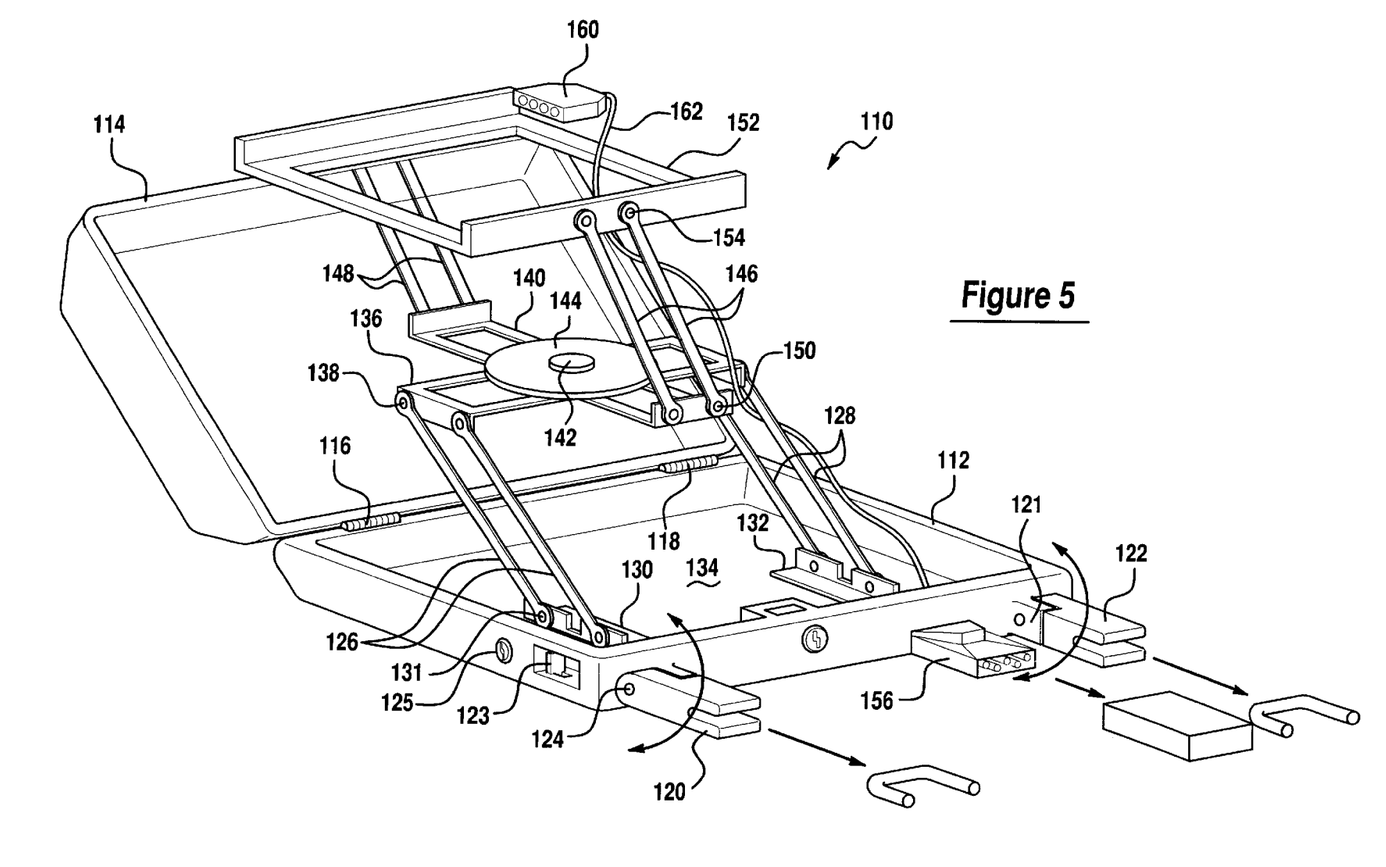
FIG. 5 is a perspective view of a container assembly that is made in accordance with the teachings of a fourth embodiment of the present invention.

Referring now to FIG. 5, there is shown a container 110 that is made in accordance with the teachings of a third embodiment of the invention. As shown, container 110 includes first and second generally rectangular members 112, 114, which are pivotally and movably coupled together by use of hinge members 116, 118.

Container 110 further includes two clamping members 120, 122, which when extended in their operative position, allow container assembly 110 to be removably attached to ISOFIX type seat members. Bottom member 112 provides integrally formed tabs 121 that allow clamping members 120, 122 to be pivotally coupled to member 112 by pins 124. In this manner, clamping members 120, 122 may pivot in the horizontal plane to accommodate varied placements of the ISOFIX members and variations in the inclination of the seat bottom. Clamping members 120, 122 are released from the ISOFIX members 14 and 16 by the selective movement of the physically attached and communicatively connected release lever 123. The release lever 123 functions to engage a conventional internal clamping mechanism (not shown) housed within the clamping members 120, 122. The release lever 123 "spreads" or opens the internal clamping mechanism of the clamping members 120, 122. The selective movement of the release lever 123 away from the clamping members 120, 122 allows disengagement from the ISOFIX members 14 and 16 and thereby allows assembly 110 to be removed from the vehicle seat. To prevent unexpected or unwanted disengagement of the container assembly 110 from the seat, the release lever 123 is held in position by the release lever lock 125. The preferred embodiment of the release lever lock 125 is a depressible button used to release the release lever 123. Another non-limiting embodiment may include the use of a key locking mechanism within the button to prevent unauthorized removal from the seat.

Container assembly 110 further includes a first and second pair of arms 126, 128 which are respectively and pivotally coupled to anchor members 130, 132 which are disposed upon surface 134 of member 112. Each pair of arms 126, 128 are further and pivotally coupled to a generally rectangular member 136 by use of pins, or dowel members 138. Member 136 is movably coupled to generally rectangular member 140 by use of pin 142 which traverses members 136, 140 and which terminates within pivot assembly 144. Container assembly 110 also includes a second pair of arms 146, 148 which are pivotally coupled to member 140 by pins or dowel members 150 and which are further and pivotally coupled to platform 152 by pins or dowel members 154. Container assembly 110 further includes a computer terminal or communications terminal member 156 which is attached to member 112 and which is electrically, physically, and communicatively coupled to the communications connector 160 by bus 162.

In operation, pins 131, 138, 142, 150, and 154 cooperatively allow members 152, 140, and 136 to be moved from a first stored and substantially flat position to a second operative raised position which is shown in FIG. 5. Further, connector 156 allows connector 160 to be coupled to a source of electronic or computerized data.

Figure 6:
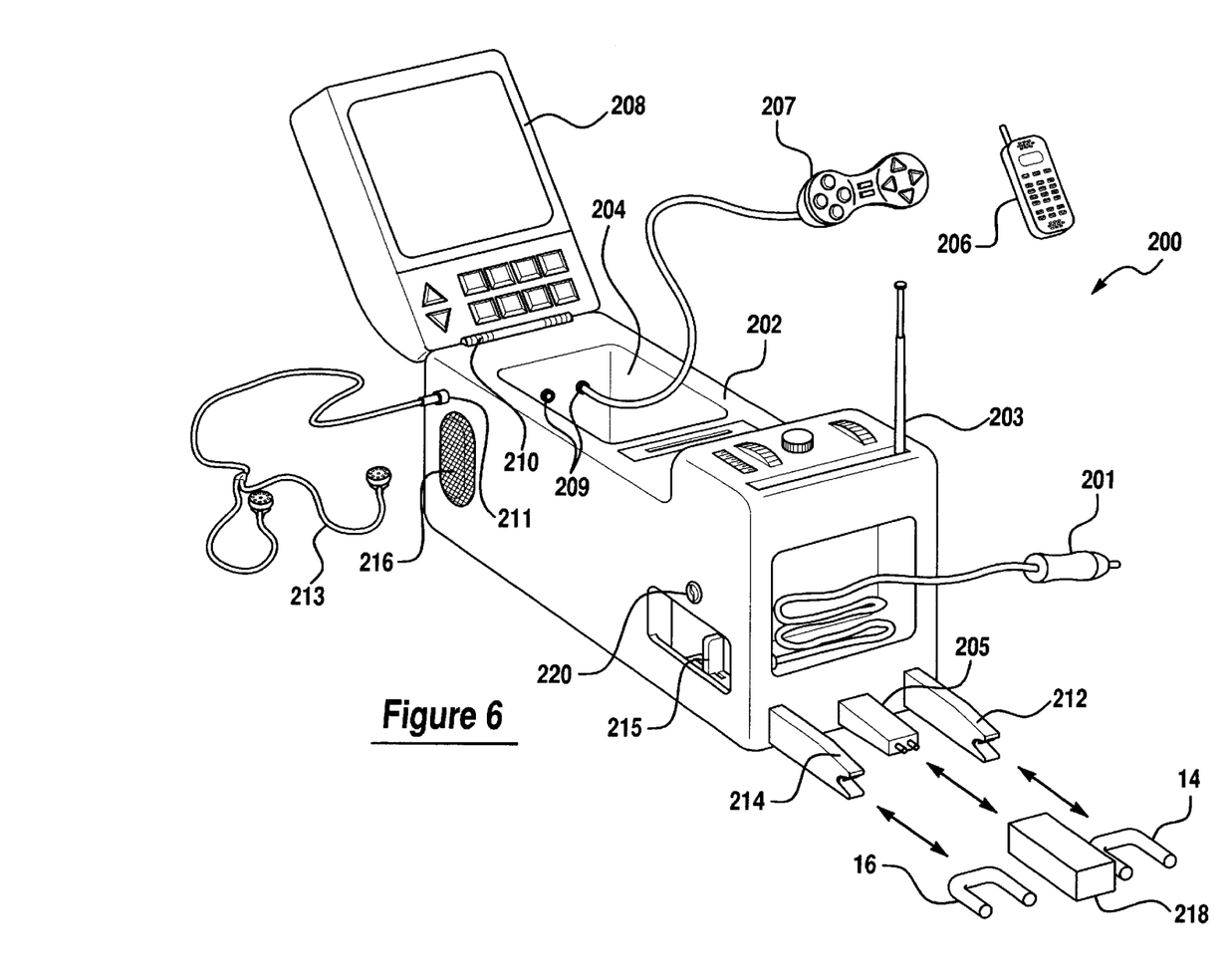
FIG. 6 is a perspective view of a container assembly that is made in accordance with the teachings of a fifth embodiment of the present invention.

Referring now to FIG. 6, there is shown a container assembly 200 that is made in accordance with the teachings of a fourth embodiment of the invention. As shown, container assembly 200 includes a body portion 202 having a cavity 204 into which a cellular telephone 206 may be operatively disposed. Assembly 200 may further include a video display screen 208, which is pivotally coupled to portion 202 by pin assemblies 210. Video display screen 208 may be operative configured to function as an interactive game display, such that assembly 200 would allow connection of typical game controllers 207 through connection ports 209.

Assembly 200 may further include a separate radio and/or television tuner assembly 203 to operate separately or in conjunction with the video display screen 208. Audio output from assembly 200 would be provided by either an internally housed speaker 216 or audio jack 211 in which typical earphones 213 may be operatively and removably placed. The electrical power requirements of assembly 200 may be satisfied by the use of either the cigarette lighter adapter plug 201 or the power interface plug 205. The cigarette lighter adapter 201 may be inserted into one the vehicle's available cigarette lighter receptacles (not shown). The power interface plug 205 may be physically and electrically coupled to a power interface receptacle 218 provided by the vehicle.

The clamping members 212, 214 of container assembly 200 are released from the ISOFIX members 14 and 16 by the selective movement of the physically attached and communicatively connected release levers 215. The release lever 215 functions to engage a conventional clamping mechanism (not shown) housed within the clamping member 212, 214. The release lever 215 "spreads" or opens the clamping mechanism of the clamping members 212, 214. The selective movement of the release lever 215 away from the clamping member 212, 214 allows disengagement from the ISOFIX members 14 and 16 and thereby allows assembly 200 to be removed from the vehicle seat. To prevent unexpected or unwanted disengagement of the container assembly 200 from the seat, the release levers 215 are held in position by the release lever locks 220. The preferred embodiment of the release lever lock 220 is a depressible button used to release the release levers 215. Another non-limiting embodiment may include the use of a key locking mechanism within the button to prevent unauthorized removal from the seat.

Figure 7:
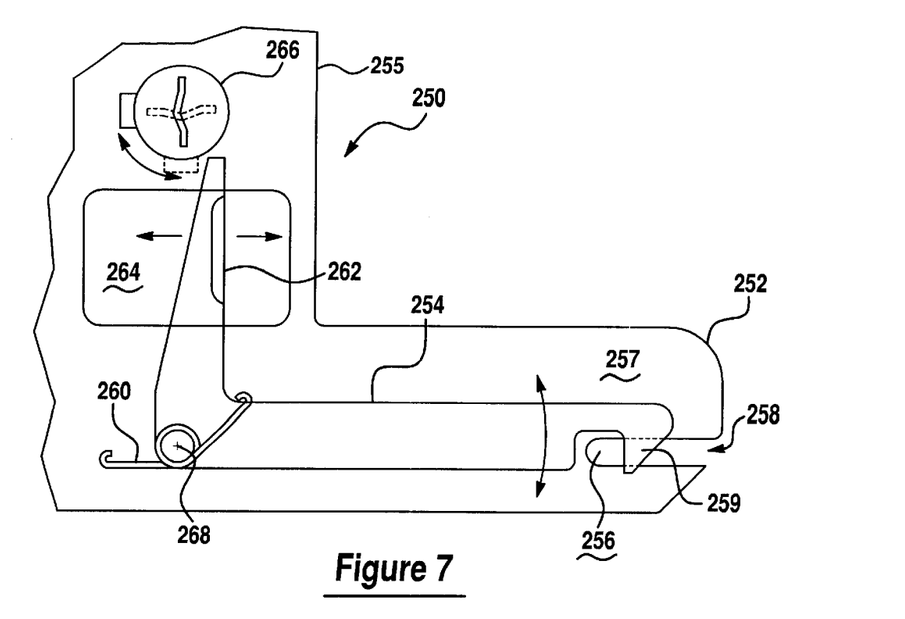
FIG. 7 is a cross-section view of a non-limiting embodiment of a clamping member used to attach a container assembly to an "ISOFIX" system.
Figure 8:
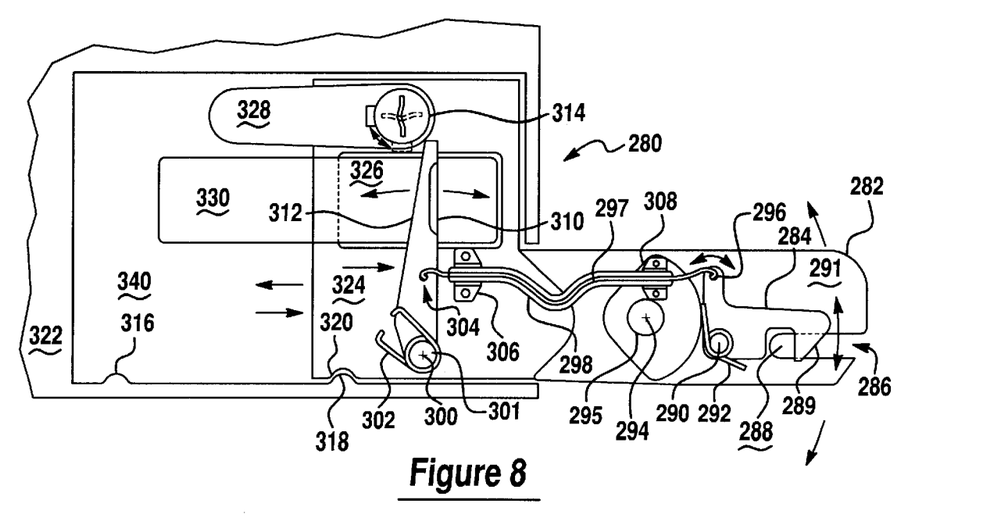
FIG. 8 is a cross-section view of a non-limiting embodiment of an articulated clamping member used to attach a container assembly to an "ISOFIX" system.

FIGS. 7 and 8 depict other non-limiting embodiments of clamping members that are used to attach a container assembly to the ISOFIX system members 14 and 16 (FIG. 1). FIG. 7 shows a cross-section cutaway view of a clamping mechanism 250. Clamping arm 252 extends outward from the body of the container assembly 255. Clamping arm 252 has a receiving slot 258 cut into the outer end, as shown, to receive and engage the ISOFIX retaining member.

The ISOFIX member is inserted in the clamping arm receiving slot 258 and is engaged by retaining notch 256 and tooth 259 of inner clamp 254. Inner clamp 254 is pivotally disposed on a pivot point 268 and has selective rotational movement about pin 268 within the constraints of the inner cavity 257 of the clamping arm 252. The rotational movement of inner clamp 254 is held in the maximum clockwise position by a wound pivot spring 260. Spring 260 functions to maintain the inner clamp 254 in a maximum "clockwise" or closed position until either the sloping front portion of tooth 259 is acted upon by the insertion of an ISOFIX member into the receiving slot 258 or until clamp 254 is moved to the open position by a user's physical input to the release lever tab 262. Release lever tab 262 protrudes outward from the side of the body of the container assembly 255 through opening 264. Release lever tab 262 allows the user to open the inner clamp arm 254 by causing rotational movement of inner clamp arm 254 about the pivot point 268 when enough physical effort is applied to the release lever tab 262 to overcome the tension of the pivot spring 260.

As previously discussed in relation to the other figures, a locking mechanism 266 is provided. The lock 266, as shown is key operated, but in another non-limiting embodiment may be a push button type latch or a combination of push button latching with key locking.

Referring to FIG. 8, shown is a cross-section cutaway view of a non-limiting embodiment of a container assembly clamping mechanism 280. The clamping arm 282 embodied in FIG. 8 is designed to engage the ISOFIX members in the same manner as the embodiment of FIG. 7, yet differs by the addition of three unique features. First, clamping arm 282 is selective disposed to rotate about a pivot point 294 of pin 295. Clamping arm 282 is free to rotate in a varying angular displacement about pin 295 to accommodate the various vehicle seat angles the container assembly will be placed upon. Clamping arm 282 extends outward from the clamping body 324. Clamping arm 282 has a receiving slot 286 cut into its outer end, as shown, to receive and engage the ISOFIX retaining member.

The ISOFIX member is inserted in the clamping arm receiving slot 286 and is engaged by retaining notch 288 and tooth 289 of inner clamp 284. Inner clamp 284 is pivotally disposed on a pin 290 and has selective rotational movement about pin 290 within the constraints of the inner cavity 291 of the clamping arm 282. The rotational movement of inner clamp 284 is held in the maximum clockwise position by a wound pivot spring 292. Spring 292 functions to maintain the inner clamp 284 in a maximum "clockwise" or closed position until either the sloping front portion of tooth 289 is acted upon by the insertion of an ISOFIX member into the receiving slot 286 or until inner clamp 284 is moved to the open position by a user's physical input to the release lever tab 310.

Second, the entire clamping mechanism 280 is retractable within the container assembly body 322. Clamping body 324 is disposed within a clamp cavity 340 within the main body of the container assembly 322. Clamp cavity 340 allows the horizontal movement of the entire clamping mechanism 280, such that, the clamping mechanism 280 may be withdrawn and stowed within the body of the container assembly. The clamping body 324, by its physical dimensions, is close fit to the interior dimensions of the clamp cavity 340, such that, moderate physical effort must be exerted to locate the clamping mechanism 280 from the open, extended position to the closed, retracted position. Dimples 316 and 318 in the clamp cavity 340 engage the recess 320 in the clamp body 324 to assist in retaining the clamping mechanism 280 in the desired position.

Third, a sheathed cable 298 is used to operate the inner clamp arm 284. Cable assembly 298 has two anchor points 306 and 308 to secure the sheathed cable to the clamp arm 284 and the clamp body 324. Cable 297 is attached to inner clamp 284 at attachment point 296 and is attached to the release lever arm 312 at attachment point 304. Cable assembly 298 allows a user the ability to open the inner clamp 284 by use of the release lever 312 while maintaining the feature of rotational movement of the clamp arm 282 about pivot point 294.

Release lever tab 310 is located on release lever arm 312, which protrudes outward from the side of the body of the container assembly 322 through opening 326 of the clamping body 324 and through opening 330 in the main body of the container assembly 322. Release lever 312 is disposed, and may rotate, about a pivot point 300 through pin 301. Release lever 312 is held in its maximum clockwise position by wound pivot spring 302. Release lever 312 allows the user to open the inner clamp 284 by causing rotational movement of inner clamp 284, about the pivot point 290, by cable assembly 298, when enough physical effort is applied to overcome the tension of the pivot springs 292 and 302.

Again, as previously discussed for the other figures, a locking mechanism 314 is provided. The lock 314 resides in the clamp body 324 and is exposed to the outside of the container assembly through opening 328. Lock 314, as shown is key operated, but in another non-limiting embodiment may be a push button type latch or a combination of push button latching with key locking.

It is to be understood that the invention is not limited to the exact embodiments which have been previously delineated, but that various changes may be made without departing from the spirit and the scope of the inventions as are delineated in the following claims.

What is claimed is:

1. A container assembly for use with a seat of a vehicle having at least one attachment member, said container assembly comprising:

a containment portion; and at least one clamping member comprising a resilient material having a pliant memory, which clamping member is attached to said containment portion and has a slotted engagement channel, said slotted engagement channel having an attachment member reception end and an opening end which is smaller than said attachment member reception end, wherein said opening end cooperates with said attachment member reception end to retain a unique one of said at least one attachment member and wherein said resilient material having a pliant memory enables said clamping member to yield to said attachment member as said attachment member is forced through said opening end and said opening end to narrow by memory as said attachment member is forced beyond said opening end into said attachment member reception end.

2. The container assembly of claim 1 further comprising a recess that is integrally formed within said containment portion.

3. The container assembly of claim 2 wherein said containment portion has a generally flat and smooth bottom which integrally terminates upon at least one side portion which cooperate with said bottom to form said recess.

4. The container assembly of claim 1 wherein said at least one attachment member is an lower anchorage of a child restraint anchorage system and said attachment member reception end is shaped to receive said lower anchorage.

5. The container assembly of claim 4 wherein said opening end of said slotted engagement channel is smaller than said lower anchorage and expands to receive said lower anchorage.

* * * * *